(12) United States Patent
Jiang et al.

(10) Patent No.: US 8,665,700 B2
(45) Date of Patent: Mar. 4, 2014

(54) FAULT DETECTION AND MITIGATION FOR IN-VEHICLE LAN NETWORK MANAGEMENT

(75) Inventors: Shengbing Jiang, Rochester Hills, MI (US); Katrina M. Schultz, Clarkston, MI (US); Kenneth P Orlando, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 110 days.

(21) Appl. No.: 13/366,453

(22) Filed: Feb. 6, 2012

(65) Prior Publication Data

US 2013/0201817 A1   Aug. 8, 2013

(51) Int. Cl.
*H04L 1/24* (2006.01)
(52) U.S. Cl.
USPC ........... 370/216; 370/250; 709/221; 709/224; 701/1
(58) Field of Classification Search
USPC ......... 370/216, 217, 218, 250, 221, 222, 223, 370/224, 253; 701/1, 36, 32.7, 31.7, 29.1
See application file for complete search history.

(56) References Cited

U.S. PATENT DOCUMENTS

| | | | |
|---|---|---|---|
| 6,484,082 B1* | 11/2002 | Millsap et al. | 701/48 |
| 7,113,860 B2* | 9/2006 | Wang | 701/93 |
| 2002/0012325 A1* | 1/2002 | Kikkawa et al. | 370/311 |
| 2006/0276947 A1* | 12/2006 | Kaita et al. | 701/48 |
| 2011/0046844 A1* | 2/2011 | Honner et al. | 701/33 |
| 2012/0106446 A1* | 5/2012 | Yousefi et al. | 370/328 |

* cited by examiner

*Primary Examiner* — Paul H Masur
*Assistant Examiner* — Michael Phillips

(57) ABSTRACT

A method of detecting and mitigating an unintended active state of an in-vehicle communication network. The in-vehicle communication network includes a plurality of electronic control units (ECUs) communicating over a controller area network bus system. Each ECU includes both transmitting and receiving capabilities, and is configured with a communication protocol that provides guidelines for exchanging messages with other ECUs within the communication system. Each ECU enters a communication kernel active state for communicating on the bus. Virtual networks within the communication system are identified. Each virtual network includes a collection of signals involving respective ECUs whose transmission and reception are started and stopped collectively as a unit. Each respective virtual network that is active by fault is detected. Each faulty active virtual network is deactivated.

19 Claims, 3 Drawing Sheets

FAULT DETECTION AND MITIGATION FOR IN-VEHICLE LAN NETWORK MANAGEMENT

BACKGROUND OF INVENTION

An embodiment relates generally to in-vehicle communication diagnostics.

In-vehicle communication systems utilize a vehicle multiplex bus to allow electronic control units (ECUs) and other devices to communicate with one another. Vehicle systems and subsystems have numerous ECUs that control actuators or receive vehicle operation data from sensing devices, which is shared between the communicating ECU.

A communication protocol is a system of digital message formats and rules for exchanging those messages in or between communication devices within the network. The in-vehicle communication system includes a transmitting node, at least one receiving node, and a network communication bus coupling the transmitting node to the at least one receiving node. Each of the transmitting nodes and the at least one receiving node includes a plurality of communication layers for servicing messages within each of the nodes within the in-vehicle communication system. The plurality of communication layers typically control the message transfer by providing rules as to how the message is formatted and how the message is exchanged.

The communication network is typically active (i.e., powered) when communications are ongoing, and is deactivated when no communications are transmitted on the communication bus. When in a deactivated state, the communication network enters a sleep mode to conserve power. This typically occurs when the vehicle is turned off. If an error occurred in the system where the network remained active after it was assumed to be inactive by all the network devices, then undesirable battery drain could occur as a result of the system being unintentionally powered.

SUMMARY OF INVENTION

An advantage of the fault detection and mitigation system is the detection of unintended active communications within the LAN communication network, and the mitigation of powering down of communicating devices within the LAN communication network for preventing battery drain caused by devices within the unintended active communication network. The detection and mitigation system detects an active virtual network (VN) or an active communication kernel and determines whether the VN is unintentionally active or the communication kernel is active with no active VNs. If the determination is that there is an unintentional activation, then the LAN communication network utilizes mitigation techniques for powering down the active devices. Such mitigation techniques may include forcing shutdown through a primary shutdown path, or an alternative shutdown path if a determination is made that the primary shutdown path is faulty by not deactivating the communication network.

An embodiment contemplates a method of detecting and mitigating an unintended active state of an in-vehicle communication network. The in-vehicle communication network includes a plurality of electronic control units (ECUs) communicating over a controller area network bus system. Each ECU includes both transmitting and receiving capabilities, and is configured with a communication protocol that provides guidelines for exchanging messages with other ECUs within the communication system. Each ECU enters a communication kernel active state for communicating on the bus. Virtual networks within the communication system are identified. Each virtual network includes a collection of signals involving respective ECUs whose transmission and reception are started and stopped collectively as a unit. Each respective virtual network that is active by fault is detected. Each faulty active virtual network is deactivated.

DETAILED DESCRIPTION

Figure 1:
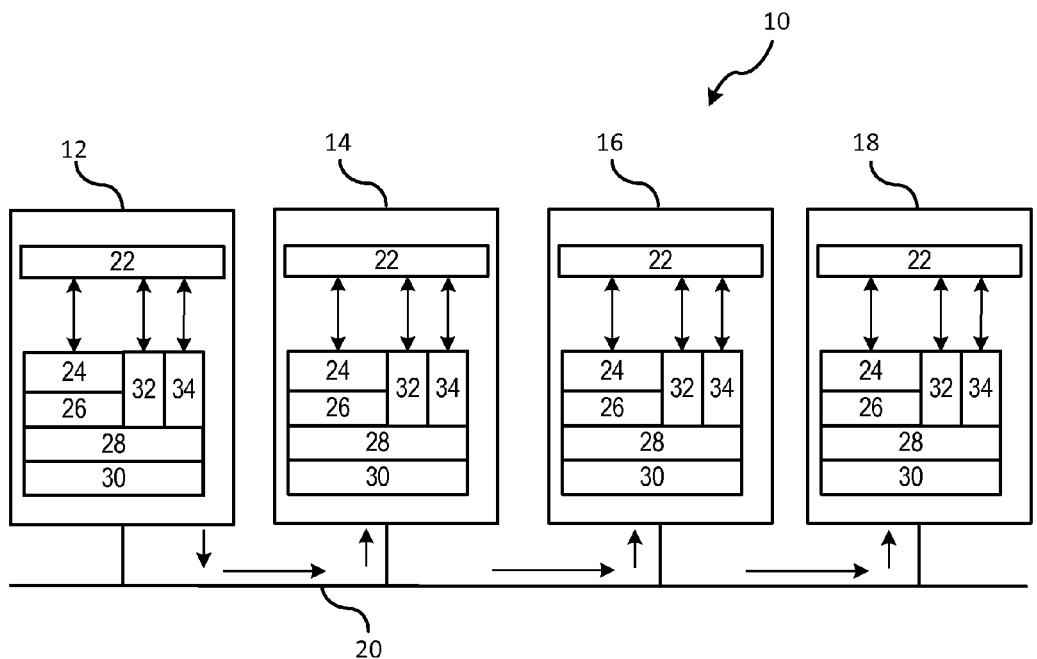
FIG. 1 is a block diagram of a LAN network communication system.

There is shown in FIG. 1, an exemplary LAN network communication system 10. The LAN network communication system 10 includes a plurality of electronic control units (ECUs) 12-18 coupled to at least one communication bus 20 which allows the ECUs to communicate with one another. Within another exemplary LAN network communication system 10 there could be three types of communication buses, a low-speed bus, a mid-speed bus, and a high speed bus. The buses utilize a controller area network (CAN) communication protocol.

The high-speed bus is typically used for sharing real time data including, but not limited to, driver-commanded torque data, actually engine torque data, steering angle data.

The mid-speed bus is typically used for infotainment applications such as display, phone, and navigation devices where the system response time demands a large amount of data be transmitted in a relatively short amount of time.

The low-speed bus typically is used for operator controlled functions where the system response time requirements are of the order 100-200 ms.

Each of the plurality of ECUs 12-18 are coupled to one or more sensors, actuators, or control devices (e.g., application components). The application components are not directly connected to the communication bus 20, but are coupled through the respective ECUs. The application components could also be software components in the ECUs. A single control feature may span across multiple application components and involve control messages from source to a destination ECU via one or more intermediate processing/control ECUs attached to the same communication bus. For the purposes of this invention, it is understood that such systems are known in the art and that ECUs, application devices, controllers, and transceivers are referred to as nodes and the details of their composition will not be discussed in detail herein. In addition, gateways may be used for establishing communication access points between different buses.

Each node includes a plurality of communication layers for servicing messages that are received from other nodes or are being prepared for transmission to other nodes. The plurality of communication layers for each ECU includes an application layer 22, an interaction layer 24, network layer 26, a data link layer 28, and a physical layer 30, a node management layer 32, and a network management layer 34. Each of the plurality of communication layers provides a function for servicing the message.

The application layer 22 interacts with a respective software application for implementing a communicating device. The application layer 22 identifies a communication entity for determining its identity; for determining resource availability that includes determining whether a network for communication exists; and for synchronizing communications between the applications that require cooperative communications.

The interaction layer 24 serves as an application program interface. The interaction layer 24 provides communication services to the application independent of the bus protocol and uses services of a transport layer for communicating on the communication network.

The network layer 26 transfers data packets using services of the data link layer 28. The network layer 26 provides an unacknowledged transport service. The network layer 26 also provides connect setup and flow control.

The data link layer 28 provides both functional and procedural processes, protocols, and specifications to transfer data between respective ECUs within the in-vehicle communication network.

The physical layer 30 provides a method for converting the digital data symbols (1's and 0's) generated by the data link layer into electrical signals transmitted on the communication medium. The physical layer sets forth the electrical and physical hardware and specifications for the communicating devices. The physical layer defines the mode of transmission (e.g., optic, copper), connector type, connector shape, electrical pin configuration, voltages, cable specifications, network adapters, and bus adapters.

The node management layer 32 is used by the node to control the start-up, shutdown, and error handling for a node where these functions do not involve interaction with the other nodes of the network and therefore can be managed locally.

The network management layer 34 is used to control the start-up, shutdown and error handling for a network of nodes, where these functions involve interaction among the nodes and therefore have to be managed globally.

The node management layer 32 and the network management layer 34 interact with the application layer 22 for controlling a start-up and shut-down of ECUs on the network. The node and network management are further responsible for communication kernel startup and shutdown, recovery from node-detected communication error conditions, and management of special application-controlled communication modes. Undesirable battery drain could result from a condition where the LAN communication network remains active after it is assumed that the LAN communication network is inactive by the entire network ECUs. Memory errors, such as a bit flip, stuck bits, or communication message errors (e.g., repetition or loss of a message) are just some of the potential causes for a mismatch in which the operating state remains active when it should be inactive. This technique described herein provides fault detection and mitigation for LAN network management for the above error condition.

The LAN Network management enables/disables collections of signals (frames) to be transmitted, received, and also error managed based on functional activation/deactivation criteria for ECU's participating in the network. The LAN network management allows subsets of the network's ECUs to communicate through a concept called "Virtual Networks" (VNs) that perform vehicle control operations while other network ECUs remain in a low-power state with their communication capabilities inactive. A VN is defined as a collection of signals involving only those ECUs whose transmission and reception are started and stopped as a unit.

A communication kernel is enabled due to an ECU power up, ECU reset, a reception of a bus wakeup message, or a Virtual Network (VN) activation request from a node local application. Following an ECU power up or an ECU reset, the ECU initializes its communication capabilities (e.g., communication kernel) and remains in a communication capable state for at least 8 seconds. Activation of the communication kernel for at least 8 seconds is executed regardless of whether an ECU has detected a local condition which requires it to communicate. This is performed so the ECU can monitor the communication bus for network management messages that indicate whether other ECUs require it to communicate in support of control operations that the other ECUs are required to perform.

The LAN communication network allows some ECUs to stay in a low-power state with their communication capabilities inactive while other ECUs actively communicate to perform vehicle control operations. Activating communication on a distributed set of ECUs is a responsibility of the network management layer and is based on collections of ECUs which form the VN to perform specific control operations. Typically, an ECU detects a condition that requires some control operations to begin, and therefore, activation of the appropriate VN. For an ECU to notify other ECUs that their participation is required, it must first start its own communication kernel and then cause other ECUs on the bus to start their communication kernels. All ECUs must then keep their communication kernels active for a pre-determined amount of time (e.g., 8 seconds) so that network messages can be transmitted. These messages allow ECUs to determine if they are being requested to participate in the VN. The ECUs forming the VN keep their communication kernels active and begin communicating control information. The communication kernel within an ECU will be shut down when no VN is required for data sharing with other ECUs. After the predetermined amount of time, the other ECUs may shut down their communication kernels and revert back to a low power state if they have no other control obligations. The decision that communication is no longer required is made by network management based on local and remote demands for virtual networks. Once a decision is made that communication is no longer required, the application involved with the communication is requested to confirm the shutdown of the communication kernel. In response to the confirmation by the application, the communication kernel associated with the ECU is shut down.

As described earlier, the activation and deactivation of VNs for a distributed set of ECUs is controlled by the network management. Prior to activating a VN, a respective ECU must first transition to a state where activation or deactivation is permitted (i.e. the state where the ECU can actively participate in vehicle control by communicating information). This is the referred to as the Communication Active state, (i.e., the Comm_Active sub-state of the Comm_Kernel_Active state). The ECU kernel can only be active if the ECU is in the ECU Comm_Kernel_Active state. A respective ECU Kernel must, at the minimum, detect bus wake up broadcasts, service application requests to start VNs, start the communication kernel when bus wakeup is receive or a VN is requested, and shutdown the communication kernel when the application confirms that the communication capabilities are no longer needed.

The Comm_Active state can be entered when either a local VN activation is requested by a local ECU application or a remote VN activation is indicated by the reception of a Virtual Network Management Frame (VNMF) message from a remote ECU. The VNMF messages are bus visible messages transmitted by remote ECUs to send VN activation requests to other network ECUs for involvement in the VN. The Comm_Active state is exited after both local and remote VN activations have been rescinded and all activated VNs become inactive for at least a predetermined period of time (e.g., 8 seconds).

To enter the communication state, the activating ECU (which detects that a given control operation should commence) is also responsible for starting a VN which enables any necessary communication. After the Comm_Active is entered, the activating ECU will broadcast a bus wakeup signal which causes other ECUs to activate their communication kernels. The bus wakeup signals are broadcast by the activating ECU to cause all ECUs on a same subnet to initialize their communication kernels.

The activating ECU broadcasting the wakeup signal also broadcasts the VNMF message which notifies the other ECUs which VN is to be initialized. ECUs configured to participate in the VN will begin communicating and will continue to communicate as long as a respective VNMF is continuously received within respective predetermined periods of time indicating that the VN is active. If ECUs receive VNMF messages indicating that the VN should be deactivated or the ECUs no longer receive VNMF messages for a predetermined period of time, then all ECUs must shut down the VN (i.e., the VN becomes inactive).

ECUs that transmit VNMF messages for activating and continuing VNs are referred to as an activation master of the VN. The activation master of a VN must transmit their VNMF messages periodically to keep the VN active. When the activation master of a VN no longer requires communication for control or receipt of application data, the activation master will deactivate the VN bit in the VNMF message. This bit provides notification to all other network ECUs via the VNMF message that it is acceptable to shut down the VN. After all network ECUs receive the VNMF message indicating that the VN is to be deactivated and no additional VNMF messages are received, the VN shall be considered deactivated.

There are three variations on how the VN start up and shut down proceeds: The most common process involves an activating ECU broadcasting a bus wakeup signal to cause the other ECUs to activate their Communication Kernels. This type of VN is referred to as a network activated VN. The activating ECU transmits a VNMF message which notifies the other ECUs which VN is to be initialized. ECUs which are then configured to participate in the VN session will continue to communicate as long as a VNMF message is received. A VNMF message that is received by the ECUs involved in the VN indicates that the VN session should remain active. If no such VNMF is transmitted/received for 8 seconds, all ECUs shut down the VN.

The second process is used if time delays associated with starting up the VN are a concern. If time delays for commencing communication are a concern, then the VN can be configured on all VN ECUs to be initially active. That is, for these VNs, the ECU's treat a bus wake up signal as both (1) a wake up signal which initiates the Communication Kernel, and (2) a VNMF message that initializes the ECU to the VN. The startup time is reduced by not having to wait for the VNMF message transmission that initializes the ECU to the VN. The process of keeping the VN active and the process of shutting down the VN are still based on re-broadcasting VNMF transmissions on a periodic basis (i.e., within a predetermined time period).

The third process involves a shared input activated VN where an application directly activates the VN. In a shared activated VN, there is neither a master activation ECU nor is there VNMF that is transmitted for activating the VN. Rather, it is a direct activation by an application. When all of the ECU's in the VN share the input that begins the control operation, their respective Communication Kernels are started simultaneously in reaction to the input. Since each of the ECUs have knowledge of the initiated VN in reaction to this input transition, neither a bus wake up broadcast signal nor a subsequent VNMF transmission signal is necessary. Rather, the VN is started based on the shared input from the application to all the ECUs. In addition, the VN shut down is not based on a timeout. The VN is shut down immediately when requested to do so by the application, presumably because the shared input has changed states.

In operations involving the network management for shutting down the network, different faults could occur such as software interferences, timing errors like loop overrun, random hardware errors like memory bit-flip, message repetition or loss due to burst bus traffic or loose wire connection, message arrival with long delay, etc. Such faults could cause the LAN communication network to remain active after it is assumed to be inactive by the entire network ECUs. As a result, undesirable battery drain could occur due to the LAN communication network module remaining active. In order to prevent the LAN communication network from remaining active, fault detection and mitigation is performed for LAN communication network by the network management module.

Figure 2:
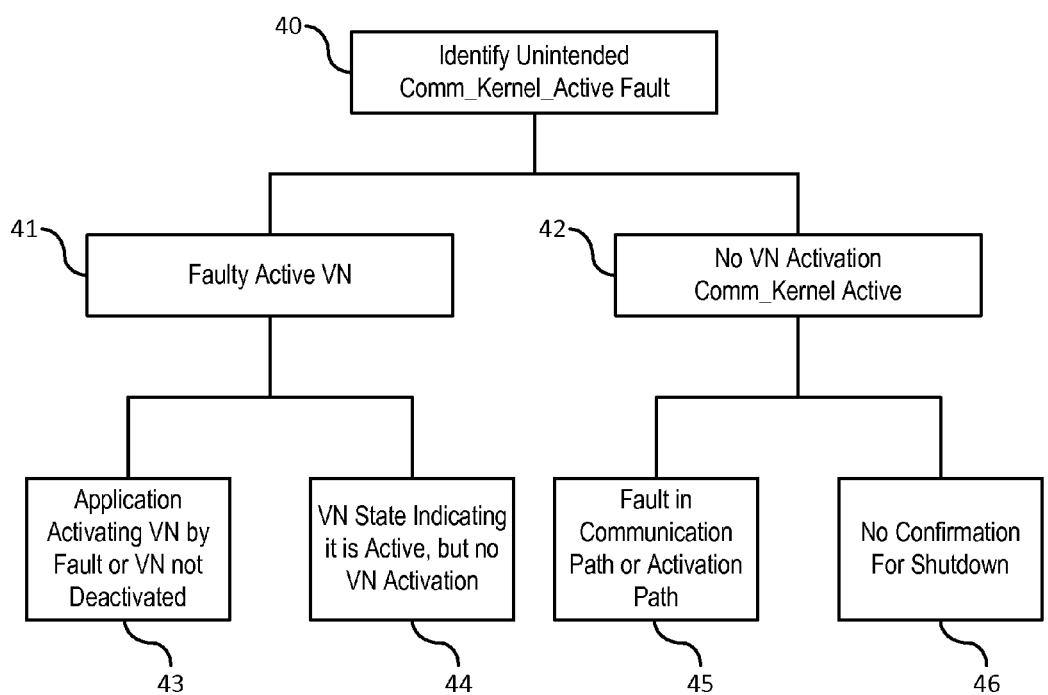
FIG. 2 is a block diagram of a fault tree for a fault detection and mitigation strategy in the LAN network communication system.

FIG. 2 illustrates a block diagram of a fault tree for a fault detection and mitigation strategy for the LAN network management. A top-down approach is used to identify the faulty conditions to be detected and mitigated and then provide a fault detection and mitigation algorithm for the LAN network management module.

As shown in FIG. 2, in block 40 an "Unintended Comm_Kernel_Active" fault is identified for detection and mitigation which is the result of the LAN communication network being active when it should be inactive. Two sub-conditions that could cause the Unintended Comm_Kernel_Active fault include (1) a faulty active VN 41 and (2) no VN activation but the Comm_Kernel remains active 42. A faulty active VN is defined as a virtual network that was activated by the system by fault or a VN remained active after the criteria for shutting down the VN was satisfied.

As described above, the faulty active VN 41 may be caused by the application activating the VN by fault or the VN was not deactivated after its activation, which is represented by block 43. This is a fault by an application and must be detected and mitigated by the application itself.

The faulty active VN 41 may also be caused by the VN state indicating it is inactive, but there is no actual VN activation, which is represented by block 44. This fault can be detected by the consistency check and can be mitigated by resetting the VN state to zero (i.e., showing inactive) and also treating the VN as inactive to prevent it from keeping communication kernel active.

For the fault situation where there is no VN activation but the Comm_Kernel remains active 42, there are two sub-conditions that may cause this fault to occur. The fault occurs either in the network management shutdown path preventing the shutdown of Comm_Kernel or in the network management activation path keeping the Comm_Kernel active by fault, which is represented in block 45. This fault can be detected by monitoring the system state with a timer. Mitigation is performed by utilizing an alternate shutdown path and at the same time preventing a fault Comm_Kernel activation after the shutdown. An alternative shutdown path is utilized because the primary shutdown path is not able to shutdown the system.

The second sub-condition involves the application not confirming the shutdown when there is no active VN for a period greater than a predetermined period of time, which is represented at block 46. That is, the application does not confirm the shutdown when there is no active VN for a period greater than a predetermined period of time. This can be detected by monitoring the system state with a timer. Mitigation includes forcing shutdown of the network when the system is calibrated to do so by the developer of the network; otherwise the mitigation is the responsibility of the application.

Figure 3A:
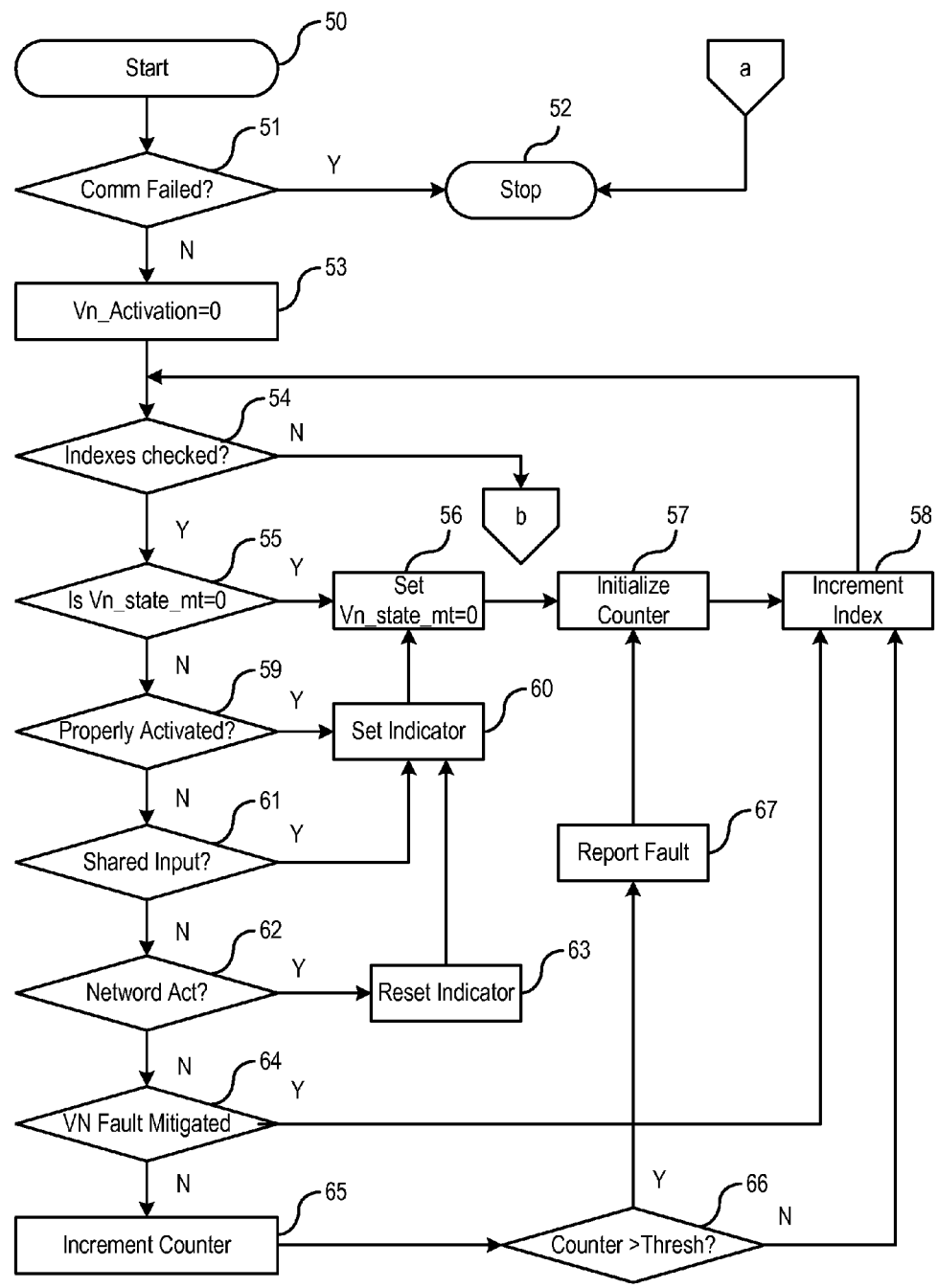
FIG. 3a is a flowchart of a fault detection and mitigation technique for the LAN network monitoring module.

FIG. 3 illustrates flowchart providing fault detection and mitigation by the LAN network monitoring module.

In step 51, the determination is made as to whether typical communication in the network is halted. If the determination is made that the typical communication is halted, then the detection and mitigation technique terminates in step 52. The detection and mitigation technique is only performed during typical communication. If the determination is made that the typical communication is not halted, then the routine proceeds to step 53.

In step 53, a virtual network activation indicator is set to zero (Has_Vn_Activation=0) and index counter is set to the first VN index (i=0). The Has_Vn_Activation indicates whether a respective VN is active or not. Therefore, Has_Vn_Activation=0 indicates that the VN is not active. The Has_Vn_Activation is initially set to zero until an active VN is detected.

In step 54, a check is made to determine whether all the VN indexes have been checked. If the determination is made that the all the VN indexes have been checked, then the routine proceeds to step 69 in FIG. 3b. If the determination is made that all the VN indexes have not been checked, then the routine proceeds to step 55.

In step 55, a determination is made whether the Network Monitoring VN state is inactive (nm_vn_State(i)=0). The checks whether a VN is active or not active. If the determination is that the current state is inactive, the routine proceeds to step 56, otherwise, if the determination is made that the VN is active (nm_vn_State(i)=1), then the routine proceeds to step 59.

In step 56, in response to the determination that the current VN is inactive, the state of mitigation for the current VN is set to zero (vn_State_Mitigated=0). That is, if the VN is determined to be inactive (as detected in step 55), then no mitigation has been performed for this VN index and the mitigation indicator is set to zero.

In step 57, the VN active counter is initialized. The counter is used as a timer to determine how long the VN remains active.

In step 58, the index is incremented for analyzing a next VN index. A return is made to step 54 to determine if all the VNs have been checked and for detecting a faulty active state.

Referring again to step 55, in response to the determination that the current VN index is active, the routine proceeds to step 59. The following steps determine whether the VN is intended to be active by the network or whether there is an unintended VN activation. In step 59, a determination is made as to whether the VN was properly activated based on the following criteria: (1) is the activation a network activated VN; (2) is the ECU the activation master for the VN; and (3) did a local application activate it. If the answer to each of the three criteria is "yes", then a determination is made that a local ECU performed the network activation and the routine proceeds to step 60. If any one of answers to the three criteria is "no", then the routine proceeds to step 61.

In step 60, in response to the determination that the VN was made active at the request of a local ECU, an activation indicator is set identifying that a VN is properly active (Has_Vn_Activation=0x11). When setting the activation indicator for identifying the VN activation, three bits are used as opposed to a single bit to avoid bit flipping which would provide a false result. The bit designation can be 0x11 which represents hexadecimals. At least two of the three bits must be set for reporting the VN as active. The routine proceeds to step 56 for setting the mitigation indicators and incrementing the counts and indexes.

Referring again to step 59, in response to any one of the criteria in step 59 resulting in a "no" response, the routine proceeds to step 61. In step 61, a determination is made as to whether the activation was the result of a shared input activation. The criteria for determining whether a shared input activation occurred are based on the following: (1) is the activation the result of a shared input activation; and (2) did an application activate the VN. A shared input activation is when there is no activation master for the VN. That is, there is no ECU that initiated the VN activation. Rather, the VN is activated as a direct communication to all ECUs from a shared input line. As a result, all of the ECUs share in the input as there is no controlling ECU and the startup and shutdown of the VN is not controlled by any VNMF message. If the determination is made that the VN is a shared input activation and that an application activated the VN, then the routine proceeds to step 60 for indicating that the index for the properly activated VN. If the determination is made that the VN is not a shared input activation or that an application did not activate the VN, then the routine proceeds to step 62.

In step 62, a determination is made whether the VN is a network active VN and that a VNMF message has been received for it. This identifies whether the VN activation was a remote activation from a remote ECU. If the determination is made that the VN is a network activated VN and a VNMF has been received for the session, then the routine proceeds to step 63, otherwise, the routine proceeds to step 64.

In step 63, a received indicator is reset to zero. This indicates that a VNMF message has been received. The program proceeds to step 60 setting the VN activation indicator and identifying that the VN was correctly activated.

Referring again to step 62, in response to the determination that either the VN was not activated by the network or that a VNMF was not received, the routine proceeds to step 64. In step 64, a check is performed as to whether the VN fault is mitigated. This step is utilized when the VN is without activation, but the communication is not fully inactive. If the VN fault is mitigated, then the fault mitigation indicator is set to one for indicating that mitigation has occurred with respect to the VN (vn_State_Mitigated(i)=1). The routine then proceeds to step 58 where the VN index is incremented. If the VN is not mitigated, then the routine proceeds to step 65.

In step 65, the VN activation counter is incremented by 1 (vn_Active_Cnt(i)=vn_Active_Cnt(i)+1).

In step 66, a determination is made whether the counter has reached a predetermined VN active time threshold (vn_Active_Cnt(i)>3*NM_VN_TIMER_CNT), where NM_VN_TIMER_CNT represents a predetermined time limit (e.g., 8 secs) for a VN to be active after VN deactivation in the cases without faults, and in this example, three times of the normal value is used for the threshold for fault detections. Note that the detection and mitigation algorithm is executed periodically. If the time counter vn_Active_Cnt(i) has a value of X then the actual time expired would be X*P, where P is the execution period of the algorithm. It should be understood that the parameter for the VN active time threshold of three is exemplary and the parameter may be more or less than three. If the count has not exceeded the VN active time threshold, then the routine proceeds to step 58 where the VN index is incremented, otherwise the routine proceeds to step 67.

In step 67, the VN active fault is reported and mitigation is performed. The indicator for the state of the VN mitigation fault is set to 1 (vn_State_Mitigation(i)=1). This indicates that the mitigation has been performed for the respective VN index. The VN state is set to zero (nm_vn_State (i)=0) as the VN state should not be active after the shutdown actions are performed. The necessary VN shutdown actions are performed and the application is informed of the VN shutdown. The routine proceeds to step 57 where the VN active timer is reset to zero (vn_Active_Cnt(i)=0) and the index is incremented to the next VN in step 58.

Figure 3B:
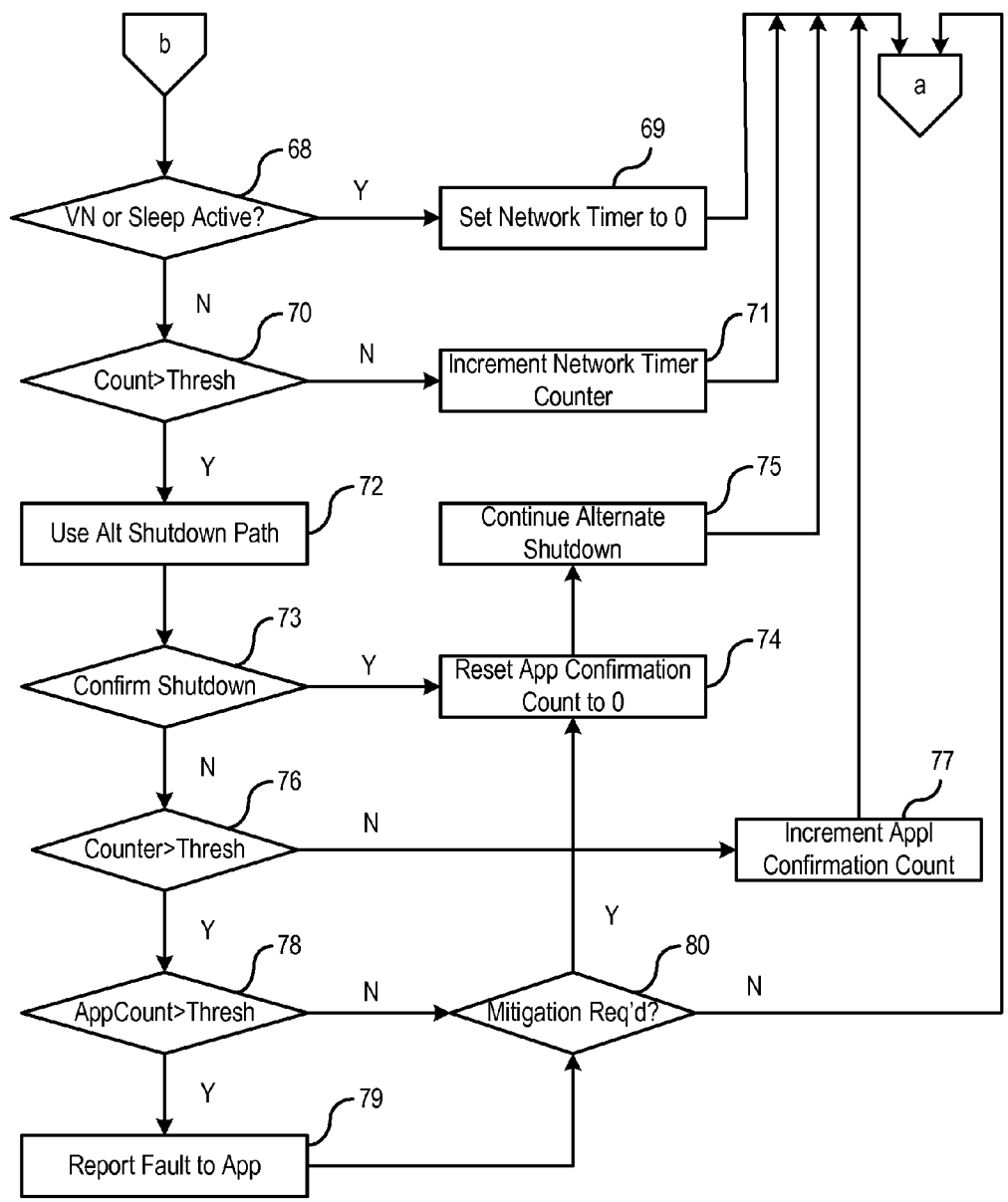
FIG. 3b is a flowchart of a fault detection and mitigation technique for the LAN network monitoring module

Referring again to step 54, in response to the determination that all VN indexes have been analyzed, the routine proceeds to step 69 of FIG. 3*b*.

Referring to FIG. 3*b*, in step 68, a determination is made whether (1) there is any active VN in the network (Has_Vn_Activation≠0) or (2) whether a network sleep mode is entered. If the determination is either there is active VN or a network sleep mode is entered, then the routine proceeds to step 69; otherwise, the routine proceeds to step 70.

In step 69, in response to either the VN being active or the network sleep mode being entered, the network active timer counter is set to zero (vn_Active_Cnt(i)=0). To avoid a false reporting of the network sleep mode being entered due to an erroneous fault such as a bit flip, three bits are used for the indication of the network sleep mode being entered. The network is reported as being sleeping only if two or three bits are set. The routine then proceeds to step 52 where the current round of execution of the algorithm is ended.

Referring again to step 68, in response to no VN being active and the network sleep mode not entered, the routine proceeds to step 70. In step 70, a determination is made whether the network active timer counter has reached a network active time threshold (nw_ActiveCnt>=nm_Wakeup_Sleep_Cnt*6). In this example, the threshold is six times the network monitoring wakeup sleep count. If the determination is that the count does not exceed the threshold, the routine proceeds to step 71 where the network active timer counter is incremented by one (nw_ActiveCnt(i)=nw_ActiveCnt(i)+1). The routine then proceeds to step 52 where the current round execution of the algorithm is ended. It should be understood that the parameter for the network activation time threshold of six is exemplary and the parameter may be more or less than six.

In step 70, if the determination is that the count does exceed the threshold, then the network active fault is reported and the routine proceeds to step 72 for mitigation.

In step 72, to mitigate the network active fault, an alternate shutdown path is utilized since the primary shutdown path is not operating properly. The alternate shutdown path utilizes newly defined variables in place of the key variables in the primary shutdown path. In addition, to prevent a recurring faulty network activation due to a stuck fault, the LAN network task will not be executed after the network is shutdown through the alternate shutdown path so that no faulty new activation occurs. Note that the network still can be activated if all the normal activation conditions are satisfied.

In step 73, a determination is made whether the application confirmed the shutdown. That is, similar to the primary shutdown path, the application must confirm shutdown when utilizing the alternative shutdown path. If the application confirms shutdown, the routine proceeds to step 74; otherwise, the routine proceeds to step 76.

In step 74, the application confirmation counter is reset to zero (Appl_Cfm_Cnt=0). The confirmation counter is maintained for keeping count of the number of times the application does not confirm the sleep request. Since the determination was that the application confirmed shutdown, the counter is reset to zero.

In step 75, the alternate shutdown is continued until shutdown occurs. After shutdown, the routine proceeds to step 52 where the current round execution of the algorithm is ended.

Referring again to step 73, if the application does not confirm shutdown, the routine proceeds to step 76. In step 76, a determination is made whether the counter is greater than a calibratable threshold (Appl_Cfm_Cnt>Appl_Cfm_Call_Num). If the count is not greater than the threshold, then the routine proceeds to step 77; otherwise, the routine proceeds to step 78.

In step 77, the application confirmation count is incremented by 1 (Appl_Cfm_Cnt=Appl_Cfm_Cnt+1). The routine then proceeds to step 52 where the current round execution of the algorithm is ended.

In step 78, in response to the application count being greater than the calibratable threshold, a determination is made whether an application fault report is required. The application fault report is reported if the respective fault is required by the system configuration. If the reporting of the respective fault is required by the system configuration, then the routine proceeds to step 79; otherwise, the routine proceeds to step 80.

In step 79, in response to the system configuration requiring the reporting of the respective fault, the application fault of the no sleep confirmation is reported to the application. The routine proceeds to step 80.

In step 80, a determination is made whether the mitigation of the application fault is required. If mitigation of the application fault is required, the routine proceeds to step 74; otherwise, the routine proceeds to step 52 where the current round execution of the algorithm is ended. That is, if mitigation of the application fault is not required, the fault mitigation is the responsibility of the application and the routine terminates.

In step 74, in response to application fault mitigation being required, the application confirmation counter is reset to zero and the shutdown is executed utilizing the alternative shutdown path in step 75.

While certain embodiments of the present invention have been described in detail, those familiar with the art to which this invention relates will recognize various alternative designs and embodiments for practicing the invention as defined by the following claims.

What is claimed is:

1. A method of detecting and mitigating an unintended active state of an in-vehicle communication network, the in-vehicle communication network including a plurality of electronic control units (ECUs) communicating over a controller area network bus system, each ECU includes both transmitting and receiving capabilities, and is configured with a communication protocol that provides guidelines for exchanging messages with other ECUs within the communication system, each ECU entering a communication kernel active state for communicating on the bus, the method comprising the steps of:

(a) identifying virtual networks within the communication system, each virtual network including a collection of signals involving respective ECUs whose transmission and reception are started and stopped collectively as a unit;

(b) detecting an active virtual network;

(c) determining that the virtual network is not a network-activated virtual network;

(d) determining that the active virtual network is not activated by a local ECU;

(e) determining that the active virtual network is not activated by a local application;

(f) identifying that the active virtual network is active by fault in response to each of the determinations in steps (c), (d), and (e); and (g) deactivating the faulty active virtual network.

2. The method of claim 1 wherein detecting the unintended active virtual network further comprises the step of:

determining that the virtual network is not a shared input activated virtual network.

3. The method of claim 2 wherein detecting the unintended active virtual network further comprises the step of:

determining that a virtual network management frame message is not received for the virtual network during a predetermined period of time.

4. The method of claim 3 wherein the predetermined period of time is measured using a timer, wherein the predetermined period of time is based on a number of times the timer times out.

5. The method of claim 4 wherein the timer is set to 8 seconds.

6. The method of claim 4 wherein the number of time the timer times out is 3.

7. The method of claim 3 wherein in response to determining an intended virtual network, at least two bits are set within the network management module for identifying the activated virtual network, wherein setting at least two bits avoids a false report of virtual network activation due to a single bit flip condition.

8. The method of claim 1 further comprising the step of reporting the faulty active virtual network to an application associated with the active virtual network.

9. A method of detecting and mitigating an unintended active state of an in-vehicle communication network, the in-vehicle communication network including a plurality of electronic control units (ECUs) communicating over a controller area network bus system, each ECU includes both transmitting and receiving capabilities, and is configured with a communication protocol that provides guidelines for exchanging messages with other ECUs within the communication system, each ECU entering a communication kernel active state for communicating on the bus, the method comprising the steps of:

identifying virtual networks within the communication system, each virtual network including a collection of signals involving respective ECUs whose transmission and reception are started and stopped collectively as a unit;

detecting no active virtual networks within the communication network;

detecting an active communication kernel within the communication network; and deactivating the active communication kernel within the communication network in response to detecting an active communication kernel and detecting no active virtual networks.

10. The method of claim 9 wherein deactivating the active communication kernel is further a function of determining that no virtual network is active within a predetermined period of time while the communication kernel is active.

11. The method of claim 10 wherein the predetermined period of time is measured using a timer, wherein the predetermined period of time is based on a number of times the timer times out.

12. The method of claim 11 wherein the timer function is set to 8 seconds.

13. The method of claim 11 wherein the number of times the timer times out is 6.

14. The method of claim 11 wherein a communication kernel being active while no virtual networks are active is a result of a faulty primary shutdown path, wherein deactivating the active communication kernel is performed utilizing an alternative shutdown path.

15. The method of claim 14 further comprising the step of:

determining whether the application associated with the active communication kernel confirmed shutdown, and wherein an application fault is detected in response to the determining that the alternative shutdown path failed to deactivate the active communication kernel within a second predetermined period of time.

16. The method of claim 15 wherein the second predetermined period of time is based on a number of times that the application associated with the active communication kernel fails to confirm shutdown.

17. The method of claim 16 wherein the active communication kernel is deactivated by the application associated with the active communication kernel in response to no confirmation of a shutdown by the application within the second predetermined period of time, and further in response to a communication system configuration requiring that shutdown is a responsibility of the application.

18. The method of claim 17 wherein the active communication kernel is deactivated by the alternative shutdown path in response to the active communication kernel remaining active after the second predetermined period of time is expired, and in response to a communication system configuration requiring shutdown through the alternative shutdown path.

19. The method of claim 18 wherein a report relating to no confirmed shutdown by the application is provided to the application in response to the system configuration requiring the report be provided to the application.

* * * * *